Patented Dec. 1, 1936

2,062,950

UNITED STATES PATENT OFFICE 2,062,950

ESTERS

Raymond E. Thomas, Newburgh, N. Y., assignor to E. I. du Pont de Nemours & Company, Wilmington, Del., a corporation of Delaware No Drawing. Application September 11, 1934, Serial No. 743,538

9 Claims. (Cl. 260—99.40)

This invention relates to new compositions of matter, more particularly to esters of high molecular weight alcohols, still more specifically to esters of aliphatic monohydric straight chain primary alcohols of 11 to 15 carbon atoms with monobasic carbocyclic acids. This invention relates even more specifically to esters of alcohols derived from coconut oil with resin acids or naphthenic acids.

Alcohols within the range of 11 to 15 carbon atoms have, until the present time, been relatively rare and the reaction of these alcohols with acids has been comparatively uninvestigated.

This invention has as an object the provision of processes whereby there are obtained esters of straight chain saturated primary monohydric alcohols with carbocyclic monocarboxylic acids. A further object is the new class of esters thus prepared. A further object is the provision of esters useful in cellulose derivative compositions. Other objects will appear hereinafter.

These objects are accomplished by the following invention wherein a carbocyclic monocarboxylic acid or its equivalent is reacted with a primary straight chain saturated alcohol having from 11 to 15 carbon atoms or the equivalent of said alcohol to form the esters of the present invention.

The esters of the present invention may be made in various ways, among which are the following:

1. Heating an alcohol with an acid, for example, dodecyl alcohol with abietic acid, yields dodecyl abietate. Catalysts such as boric acid, zinc dust, etc., may be used.

2. Heating an alkyl halide or an alkyl sulfate with the salt of an acid, for example, tetradecyl bromide with sodium abietate, yields tetradecyl abietate.

3. Heating an alkyl sulfonate with the salt of an acid, for example, p-toluenesulfonate of naphthenyl alcohols with sodium abietate, yields naphthenyl abietate.

4. Heating a high boiling alcohol with an ester of an acid and a volatile alcohol, for example, methyl naphthenate with tetradecyl alcohol, yields tetradecyl naphthenate.

5. Reacting an alcohol with an acid chloride or acid anhydride, for example, dodecyl alcohol with benzoyl chloride or benzoic anhydride, yields dodecyl benzoate; or tetradecyl alcohol with abietic anhydride yields tetradecyl abietate.

Having outlined above the general principles and purposes of the invention, the following illustrations thereof are added for purposes of illustration but not in limitation:

*Example 1.—Dodecyl abietate*

One hundred sixty-three parts by weight of dodecyl alcohol, 265 parts by weight of rosin were heated in a 3-neck flask equipped with a gas inlet tube for the introduction of carbon dioxide, a thermometer, and a tube connected with a downward condenser. Carbon dioxide was bubbled thru the reaction mixture while it was heated at about 250° C. for 29 hours. The oily product was then heated under 2 mm. vacuum and about 5% of the total weight of the product distilled below 171° C. The residue was a light brown oil which had an acid number of 25.7. Dodecyl abietate is soluble in acetone, butyl acetate, toluene and gasoline.

*Example 2.—Dodecyl hydroabietate*

One hundred eighty-six parts by weight of dodecyl alcohol and 306 parts by weight of hydroabietic acid were heated at about 250° C. for 24 hours in a one liter flask with a stream of carbon dioxide passing thru to assist in the removal of the water. The oily product was subjected to vacuum distillation at 2 mm. and about 15% distilled below 158° C. The light yellow oil had an acid number of 47.3.

The hydroabietic acid used in the above example may be either the di- or tetrahydro acid.

*Example 3.—Dodecyl salicylate*

Forty-five and six tenths parts by weight of methyl salicylate, 55.8 parts by weight dodecyl alcohol, 98.6 parts by weight of toluene, and 3 parts by weight of litharge were heated under a fractionating column and the low boiling material removed, until the reflux temperature was constant at about 108° C. indicating removal of all methyl alcohol. The solution was cooled, filtered from the catalyst, and steam distilled under reduced pressure to remove unreacted methyl salicylate and dodecyl alcohol. The crystals which formed on cooling the reaction flask were dissolved in ether and the ether solution washed with water and dried with sodium sulfate. On evaporation of the ether, white crystals remained. The saponification number of the crystalline product is 175.8; calculated for dodecyl salicylate 165.8.

*Example 4.—Mixture of abietates of alcohol containing an even number of carbon atoms from $C_6$ to $C_{18}$*

A mixture of 392 g. of the crude alcohol mixture, 670 g. of crude abietic acid, 106 g. of a high boiling naphtha fraction from coal tar were heated in an apparatus such that the hydrocarbon and water boiled off and the hydrocarbon layer which separated was returned to the reaction flask. After heating for 36 hours the acid number of the product had been reduced to 43. At this point 50 g. more of the alcohol mixture was added and the heating was continued for 24 hours. The acid number had then been reduced to 29. The product was a dark brown liquid containing the abietic esters of all of the alcohols together with a small amount of unchanged abietic acid. The esters of 12 and 14 carbon atom alcohols predominated.

Example 5.—Dodecyl abietate

Eighty-five parts by weight of dodecyl p-toluenesulfonate, 73 parts by weight of sodium abietate were reacted in a solution consisting of 7.1 parts by weight of sodium hydroxide in 142 parts by weight of water. After refluxing two hours, a layer of liquid separated, which was dissolved in ether, washed with water, and the ether evaporated. The product was an oil.

Example 6.—Dodecyl abietate

Forty-five grams dodecyl alcohol and 60 g. of abietic acid were heated in a stream of carbon dioxide at 200°–235° C. for about 45 hours. The brown viscous product had an acid number of 8.6.

Example 7.—Tetradecyl abietate

Fifty grams of tetradecyl alcohol and 60 g. of abietic acid were heated about 46 hours. The brown waxy product had an acid number of 24.8.

The scope of the invention is best indicated by a general formula for the esters which is $$RCOOR'$$

in which R is a monovalent carbocyclic radical and RCOO may be derived from naphthenic acids, hexahydrobenzoic acid, resin acids, abietic acid, hydroabietic acid, and the aromatic acids, such as benzoic acid, naphthoic, salicyclic, toluic, cinnamic acid, hydrocinnamic acid and other aromatic acids, and R' is an aliphatic hydrocarbon radical derived from a primary straight chain alcohol of 11 to 15 carbon atoms, including undecyl, dodecyl, tridecyl, tetradecyl and pentadecyl.

The dodecyl and tetradecyl esters are the preferred esters and the esters with abietic acid are preferred to the esters with naphthenic acids which in turn are preferred to the esters of aromatic acids, such as benzoic acid. In other words, the esters of alicyclic acids are preferred to the esters of aromatic acids. Thus, for use in coating compositions the esters of the alicyclic resin acids and naphthenic acids are more useful than are the esters of aromatic acids. For certain technical applications mixtures of esters are preferred to the pure compounds. Thus, in coating compositions mixtures of dodecyl and tetradecyl abietate are frequently much more advantageous than is pure dodecyl abietate. Particularly desirable compositions coming within the scope of this invention are the mixtures of esters of abietic acid in which dodecyl abietate or tetradecyl abietate are the predominating esters. An example of such a composition is the ester mixture resulting from the esterification by means of abietic acid of the mixture of alcohols obtained by the carboxyl hydrogenation of coconut oil, coconut oil acids, palm kernel oil or palm kernel oil acids. Dodecyl and tetradecyl alcohols predominate in the mixture of alcohols obtained by the carboxyl hydrogenation of coconut oil or palm kernel oil or oil acids. The mixture of alcohols contains these two alcohols in substantial amounts, i. e., at least 15% each.

The essentially saturated liquid fats or oils represented by coconut oil and palm kernel oil represent a particularly desirable source of the alcohols which are used to prepare the esters of the present invention. These oils may be reduced to long chain primary monohydric alcohols by various methods, the oil itself or the oil acid or the monohydric alcohol esters of the oil acid being capable of reduction by various methods. To comprise these various modifications of the oils, the term "fatty acid radical occurring to a substantial extent in an essentially saturated fatty oil" is used.

The esters of the present invention are of use as ingredients for coating compositions, for example in coating compositions containing cellulose derivatives, such as nitrocellulose, ethyl cellulose, cellulose acetate, etc. They are also of use as moistureproofing agents for transparent sheeting. The esters of abietic acid, such as dodecyl abietate or dodecyl hydroabietate, are saponified with extreme difficulty and for this reason are to be preferred to esters of aromatic acids, such as dodecyl benzoate, in plastic compositions with cellulose nitrate. The esters of the present invention are sufficiently non-volatile to be useful as plasticizers, while esters with higher molecular weight alcohols, such as cetyl abietate, are waxy solids, have a tendency to be less compatible with cellulose derivatives and are not so readily retained in plastics as liquid esters of the present invention exemplified by dodecyl abietate.

The above description and examples are intended to be illustrative only. Any modification of or variation therefrom which conforms to the spirit of the invention is intended to be included within the scope of the claims.

I claim:

1. A mixture of esters of a monocarboxylic carbocyclic acid with the mixture of alcohols obtainable by the carboxylic reduction of the fatty acid radicals in an essentially saturated fatty oil, said alcohol mixture having dodecyl alcohol as its principal component.

2. A carbocyclic monocarboxylic acid ester of the mixture of alcohols obtainable by the carboxylic reduction of the fatty acid radicals of coconut oil.

3. A monocarboxylic carbocyclic acid ester of dodecyl alcohol.

4. An abietic acid ester of the mixture of alcohols obtainable by the carboxylic reduction of the fatty acid radicals occurring in coconut oil.

5. Dodecyl abietate.

6. Dodecyl hydroabietate.

7. A mixture of esters of an alicyclic monocarboxylic acid with the mixture of alcohols obtainable by the carboxylic reduction of fatty acid radicals occurring in an essentially saturated fatty oil, said alcohol mixture having dodecyl alcohol as its principal component.

8. A mixture of esters of an alicyclic monocarboxylic acid with the mixture of alcohols obtainable by the carboxylic reduction of the fatty acid radicals of coconut oil.

9. A hydroabietic acid ester of the mixture of alcohols obtainable by the carboxylic reduction of the fatty acid radicals occurring in coconut oil.

RAYMOND E. THOMAS.